United States Patent [19]

Fowler et al.

[11] Patent Number: 4,502,116

[45] Date of Patent: Feb. 26, 1985

[54] MULTIPLE PROCESSOR SYNCHRONIZED HALT TEST ARRANGEMENT

[75] Inventors: Glenn D. Fowler, Canal Winchester, Ohio; Patrick A. Shannon, Oak Park, Ill.; Ronald L. Stout, Elgin, Ill.; Jean Yao, Naperville, Ill.

[73] Assignee: AT&T Bell Laboratories, Murray Hill, N.J.

[21] Appl. No.: 442,353

[22] Filed: Nov. 17, 1982

[51] Int. Cl.³ .............................................. G06F 15/16
[52] U.S. Cl. .................................................... 364/200
[58] Field of Search ........................ 364/200 MS File

[56] References Cited

U.S. PATENT DOCUMENTS 4,128,876 12/1978 Ames et al. .................... 364/200

Primary Examiner—Raulfe B. Zache
Attorney, Agent, or Firm—F. W. Padden

[57] ABSTRACT

A hardware and algorithm synchronizing arrangement comprising a subsystem synchronization interface circuit is disclosed for controlling the testing of multiple interconnected processors. The circuit permits the pausing of one processor to cause the other interconnected processors to pause as well. The circuit enables a synchronized resumption of the interconnected processors operations. Logic circuitry and signaling interconnections control individual and multiple simultaneous pauses and full duplex operation of a plurality of central control facilities.

12 Claims, 9 Drawing Figures

SUBSYSTEM SYNCHRONIZATION

INTERFACE CIRCUIT

MULTIPLE PROCESSOR SYNCHRONIZED HALT TEST ARRANGEMENT

CROSS REFERENCE TO RELATED APPLICATIONS

The following application was filed on Sept. 30, 1982: Brahm Ser. No. 430,681; and assigned to the same assignees as this application.

TECHNICAL FIELD

This invention relates to data processing systems, and more particularly to the testing of multiple processor systems.

BACKGROUND OF THE INVENTION

The testing and debugging environment for any software driven processor system requires the ability to stop execution of the system at various points in order to determine the state of the system and then to efficiently restore the system state and to restart execution. This ability to stop or pause execution, to determine the state of the system, and then to restart or resume execution of the system is normally provided by a test utility system for the processor. A test utility system is typically a separate computer system used for testing the processor. This test utility system would normally provide a breakpoint feature and the ability to read/write/modify the memory and registers of the processor system under test.

In a single processor system, testing and debugging in this type of environment usually causes no problems. However, in a multiprocessor system, where the processors are essentially executing asynchronously and the test utilities for the subsystems are independent of each other, this type of testing environment can create problems.

One such problem is that an interruption of program execution by one of the processors oftentimes results in other of the processors interpreting the stoppage as a fault condition because of their inability to communicate with the stopped processor. As a consequence, those other processors erroneously interrupt their own processing, identify that "fault" and attempt inappropriate fault recovery or analysis operations. The interruptions effectively are cascaded among all of the processors to the extent that the entire multiprocessor system operation may be put into a fault analysis and recovery mode when it is not necessary. Obviously, such actions interfere with communication and data processing operations, and are inefficient for fault recovery. Moreover, the stopping of a single processor interferes with the testing program and requires a complex recovery scheme to return all of the processors to normal operating tasks.

Another problem is that the halting of one processor may have been caused by an event in the other processor. To determine possible cause/effect relationships between processors, it is useful to be able to halt and examine the state of each to determine the relationship when any one stops.

SUMMARY OF THE INVENTION

An object of this invention is to provide a stable testing and debugging environment for a multiprocessor system and the ability to examine one or all processors when one or more halts. The latter aids debugging of the total system.

A specific object is to provide an external mechanism for controlling a synchronization of the pausing/resuming of the processors operations. Such a mechanism provides for:

1. A stopping (pausing) of one processor in the multiprocessor system and a resultant stopping (pausing) of the remaining processors.
2. A storage, or saving, of the current system state of each subsystem when the processors are paused.
3. A means to display and modify the memory and registers of each subsystem while they are paused.
4. Ensuring that system real time essentially stops so that real time dependent activities and processes are not affected.
5. A means to restart all subsystems only if none is stopped (paused), and to restore the state of each subsystem (and to restart (resume) system execution as if no time had elapsed).
6. A means for allowing some subsystems to only assert the pause/resume conditions, only for some subsystems to receive the pause/resume conditions, and for allowing some subsystems to both assert and receive the pause/resume conditions.

The foregoing objects are achieved in accordance with principles of an exemplary embodiment which comprises an arrangement referred to herein as Subsystem Synchronization. The latter is a combination of hardware and software facilities which effect a coordinated simultaneous pausing/resuming of a plurality of the subsystems advantageously without inducing any unwarranted recovery actions or causing any real time or communication problems.

Specifically, the hardware structure of the Subsystem Synchronization illustratively comprises a circuit external to the multiprocessor subsystems for providing pause/resume interface control signals to and from subsystems. The external circuit is responsive to a pause/resume signal from any subsystem by applying a pause/resume signal to all of the other processor subsystems of the multiprocessor system and thereby to preclude any undesired fault recovery operations of the system.

A feature of the illustrative embodiment is that a processor subsystem which is halted generates a pause signal that is concurrently transmitted to all other processor subsystems and thereby instantly precludes any unwarranted fault analysis or recovery operations.

To elaborate, a pause/resume-out signal from a subsystem is an input to the Subsystem Synchronization circuit and is an indication of whether that subsystem is paused or executing. The output of the Subsystem Synchronization circuit is a pause/resume-in signal to all other subsystems and indicate whether those subsystems should pause or continue execution. The circuit also provides a delay feature for the pause/resume signals in order to eliminate lockout and race conditions between the subsystems.

The software, or program, implementation of Subsystem Synchronization for effecting the pausing/resuming of system execution, is a feature of the test utility arrangement for each of the subsystems. An assert pause portion thereof allows the subsystem to be paused by the utility with the current system state saved and causes a pause signal to be broadcast by the subsystem. An assert resume portion allows the utility to restore the system state, to restart or resume system execution, and to broadcast a resume signal. A receive pause portion of the feature, normally interrupt driven, allows each subsystem to discontinue system execution, freezing and saving the current system state, when a pause signal is received. A receive resume portion allows the saved system state to be restored and for system execution to restart, at the point where the pause signal was received, when the resume signal is received. The program implementation also allows the test utility of the subsystem to be used whenever that subsystem is paused, whether paused by itself or another subsystem, in order to retrieve data about the state of the subsystem. The program and hardware implementation for each subsystem is equipped to assert and receive pause/resume signals while enabling that subsystem to receive its own pause signal without creating a lock condition. Not all subsystems are required to both assert and receive pause/resume signals.

Because of hardware delays and the program execution times for the Subsystem Synchronization feature, the subsystems do not actually pause/resume simultaneously. However, the delay between the first and last subsystem pausing or resuming causes no adverse affects. The appropriateness of the delay is a function of the interconnected processor. For some applications this interval may be too long and a faster communication mechanism may be required. This combined hardware and software mechanism, Subsystem Synchronization, provides external pause/resume synchronization among the multiprocessor subsystems and allows for stable testing and debugging in the multiprocessor environment.

DETAILED DESCRIPTION

Figure 1:
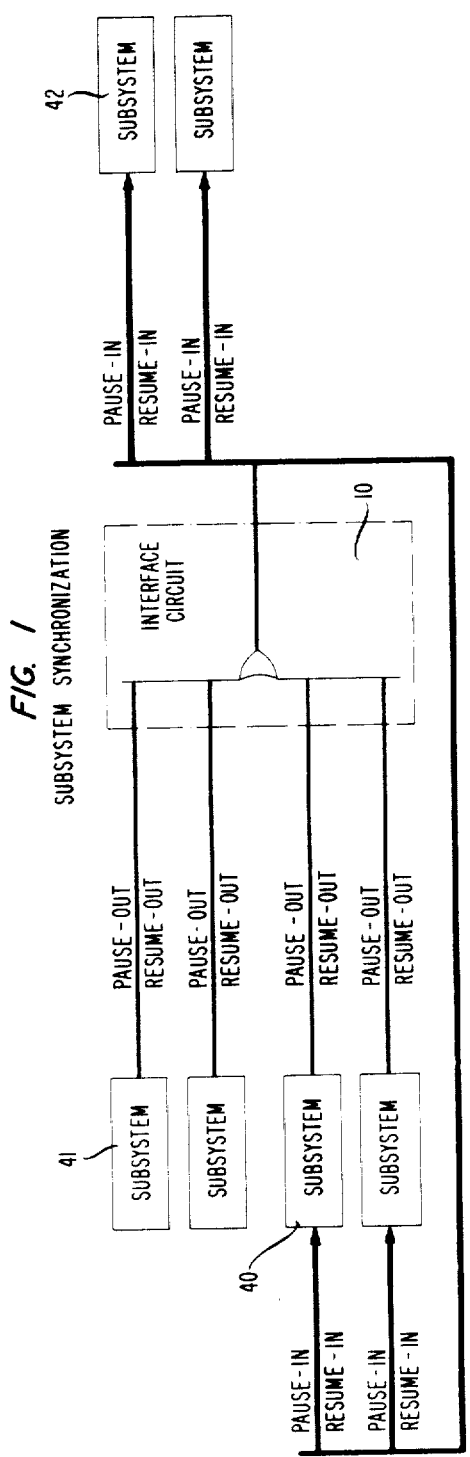
FIG. 1 is a block diagram of a multiple processor system utilizing the present invention.

The hardware configuration of Subsystem Synchronization, shown in FIG. 1, comprises Subsystem Synchronization Interface circuit 10, that synchronizes subsystems 40, 41 and 42, and includes interconnecting cables to the subsystems 40, 41 and 42 for sending and receiving the pause/resume signals.

From a logical standpoint, the Subsystem Synchronization Interface circuit 10 is basically a multi-input and multi-output inclusive OR function as shown in FIG. 1. For Subsystem Synchronization, the subsystems assert pause-out or resume-out signals and receive pause-in or resume-in signals. The pause-out and pause-in signals are the true conditions and the resume-out and resume-in signals are the false conditions. This logical representation shows that any one or combinations of pause-out (true) signals asserted by the subsystems causes a pause-in (true) signal to be received by the subsystems. This representation also shows that multiple pause-out (true) signals from the subsystems cause a pause-in (true) signal to be received by the subsystems until all subsystems assert a resume-out (false) signal. Any pause-out signal from a subsystem is a pause-in signal to the interface circuit 10 and causes a pause-out signal from the interface circuit 10 which is asserted to the subsystems as a pause-in signal. Any resume-out signal from a subsystem is a resume-in signal to the interface circuit 10 and all subsystems must assert a resume-out signal to cause a resume-out signal from the interface circuit 10 which is asserted to the subsystems as a resume-in signal. Also, as shown in FIG. 1, Subsystem Synchronization can be configured such that some subsystems 41 may only assert pause/resume signals, some subsystems 42 may only receive pause/resume signals, and some subsystems 40 may both assert and receive pause/resume signals.

Figure 2:

Each subsystem typically comprises one processor of a multiprocessor system and its related test equipment. For example, Subsystem 42 may comprise a computer driven telephone call traffic load generator, such as shown in FIG. 2. A minicomputer such as a PDP 11/70 is arranged with call-out devices to place telephone calls into the telephone network controlled by an ESS (Electronic Switching System) so that the ESS response under load conditions can be observed. Such a telephone call generator typically will be stopped along with the ESS under test conditions, so that a pause-in signal from Subsystem Synchronization is needed. The pause-in typically causes an interrupt in the PDP 11/70. Software in the PDP 11/70 suspends further call generation until the signal changes to the resume condition.

Figure 3:
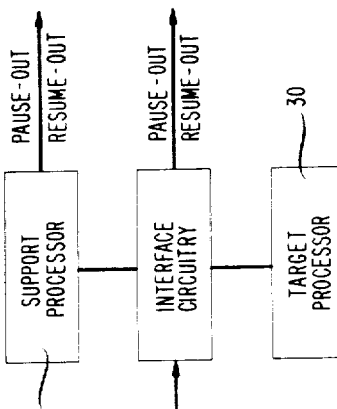
FIGS. 2 and 3 show typical subsystems as set forth in FIG. 1.

FIG. 3 shows a typical processor test arrangement of an illustrative ESS. Target processor 30 is, by way of example, one of the ESS processors under test. Support processor 31 is a utility system for measuring performance, gathering and presenting data from the target processor. Support processor 31 may include, for example, a PDP 11/70 operating under a general purpose time sharing system with test personnel users communicating via time sharing terminals. Support processor 31 may halt the ESS in response to a user request or in response to a test condition in processor 30 by producing a pause out signal. Such a utility system is an example of a subsystem shown at 41 in FIG. 1 having only a pause-out connection.

Interface circuitry 32 provides data paths between the support and target processors enabling the utility to perform its test function. In addition, the interface receives pause-in signals to halt processor 30 and produces pause-out signals to halt the rest of the ESS when called for by processor 30. Interface 32 is an example of a subsystem shown at 40 in FIG. 1.

Figure 4:
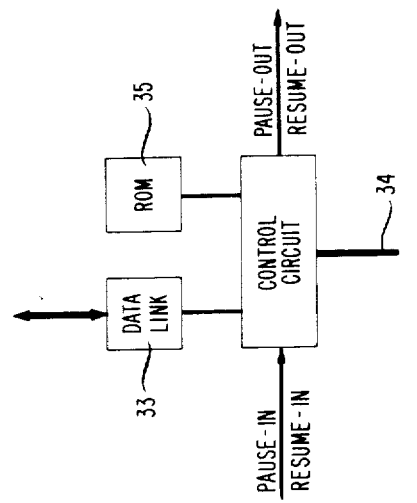
FIG. 4 details typical interface circuitry set forth in FIG. 3.

FIG. 4 shows certain details of interface circuitry 32 including a two-way data link 33 to communicate serially with the support processor 31, and a data bus 34 to read/write control information in the target processor 30. Read only memory 35 contains diagnostic or other utility programs that are loaded in the target processor 30 under control of the support processor 31 when the processor 30 is halted. Processor 30 can then execute the program thus provided and assist the processor 31 in its test activities.

Figure 5:
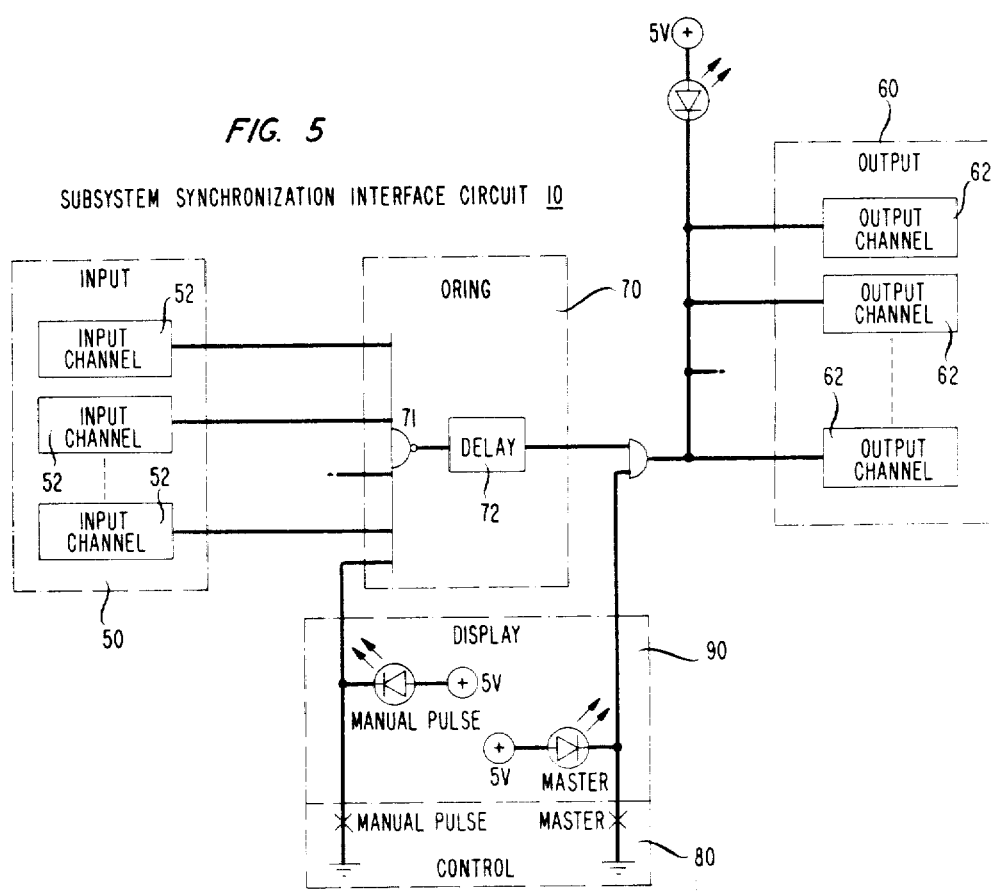
FIG. 5 is a portion of an embodiment of the present invention showing the "OR"ing function.

Referring now to FIG. 5, the Subsystem Synchronization Interface circuit 10, consists of five major sections of circuitry: input, output, ORing, control, and display. The input section 50 of the interface circuit receives the pause/resume-out signals which are asserted by the subsystems. The input ports are designed using differential type receivers and require a differential interface from the subsystems. The input channels 52 provide four (4) input ports each and can be used to interface any subsystem. The channels with the four input ports inclusive OR the inputs such that any one or combination of the four receiving a pause signal causes a pause signal for that channel.

The output section 60 of the interface circuit provides output channels 62 for sending the pause/resume-in signals to the subsystems. The output ports are designed using differential type drivers and require a differential interface at the subsystem. The output channels 62 provide four (4) output ports each and can also be used to interface any subsystem. The channels with the four output ports have the capability to independently interface to as many as four separate subsystems.

The ORing section 70 of the Subsystem Synchronization Interface circuit accepts the pause/resume-out signals asserted by the subsystems on the input ports and determines if a pause-out (true) condition is being asserted by one or multiple subsystems. If a pause-out condition is being asserted, ORing circuitry 71 routes the pause condition to the output ports for dispatching as a pause-in (true) condition to the subsystems. The ORing circuitry performs essentially the same function when the pause condition returns to the resume (false) condition. The ORing section also provides a delay 72 for the pause and resume conditions in order to eliminate any race and lockout situations. If a pause condition is received by the ORing circuit, the pause condition is delayed for approximately six hundred (600) microseconds in the present embodiment before being sent to the subsystems. When the resume condition is received by the ORing circuit it is also delayed for approximately six hundred (600) microseconds.

The control section 80 of the Subsystem Synchronization Interface circuit provides users with toggle switches to configure the pause/resume synchronization of the multiprocessor system. The control circuitry provides a manual pause switch to allow a user to manually generate a pause signal. This allows users to stop or pause the subsystems by a means other than the test utilities. The control section provides a master switch to perform an overall enable or disable of Subsystem Synchronization. This allows users to test and debug with or without the pause/resume synchronization capabilities of Subsystem Synchronization. It also provides users with a means for clearing lock conditions which could possibly occur.

The display or monitor section 90 of the interface circuit interfaces to the LED (light emitting diode) indicators. This circuitry and the LED indicators provide users with a visible indication of the configuration and status of Subsystem Synchronization, including indicator signals to the Master Enable/Disable LED, the Manual Pause Enable/Disable LED and the Stop The World (multiprocessor normal operations) LED 63.

Figure 6:
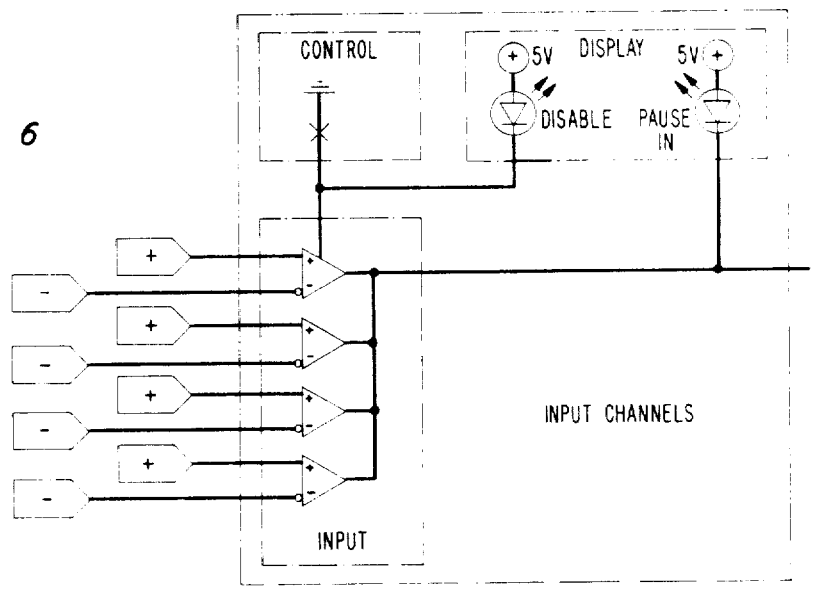
FIG. 6 is a portion of the present embodiment showing an input channel.

FIG. 6 details the input channels for use in input section 50, including display and control circuitry.

Figure 7:
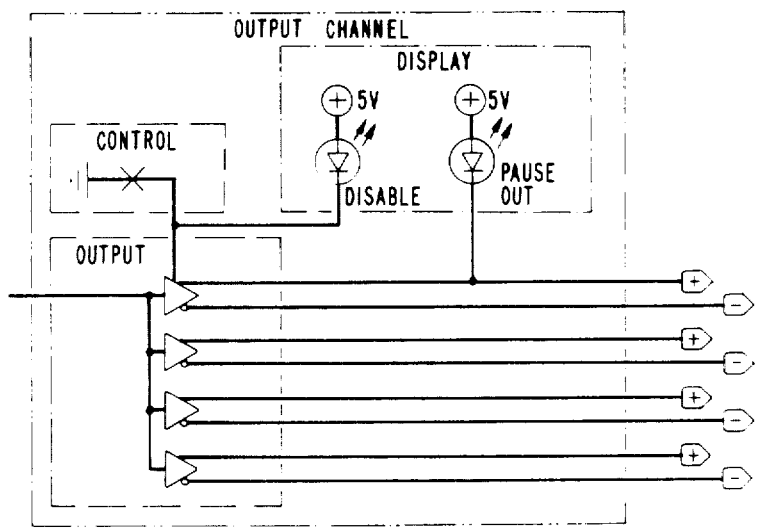
FIG. 7 is a portion of the present embodiment showing an output channel.

FIG. 7 details the output channels for use in output section 60 including display and control circuitry.

Various switches and indicators of FIGS. 5, 6, and 7 are described below.

MANUAL PAUSE SWITCH (FIG. 5)

This switch allows a user to assert a Stop The World signal from the control panel. The enable position asserts a Stop The World signal and turns "on" the associated LED indicator. The disable position removes the Stop The World signal and turns "off" the LED indicator.

MASTER SWITCH (FIG. 5)

This switch performs an overall enable or disable of Subsystem Synchronization. In the enable position, Subsystem Synchronization is enabled and the associated LED indicator is "off". In the disabled position, Subsystem Synchronization is disabled and the indicator is "on". It also enables or disables the Stop The World feature.

STOP THE WORLD INDICATOR (FIG. 5)

When "on" the indicator indicates that the Stop The World signal (pause) is being asserted. When "off" the indicator indicates that the Stop The World signal (pause) is not being asserted or that it is blocked.

CHANNEL DISABLE/ENABLE SWITCH (FIGS. 6, 7)

These switches determine which subsystems will be synchronized. The enable position allows a subsystem to be synchronized and the associated disable indicator will be "off." The disable position inhibits a subsystem from being synchronized and the indicator will be "on."

PAUSE-IN INDICATORS (FIG. 6)

When "on" these LED indicators indicate that a subsystem is asserting a Stop The World signal.

PAUSE-OUT INDICATORS (FIG. 7)

When "on" these LED indicators indicate that a Stop The World signal is being sent to a subsystem.

The interface of Subsystem Synchronization uses differential signaling interface for the pause/resume signals. This applies to both the asserted and received signals. The differential interface consists of a differential line driver 63 in FIG. 7, a twisted pair transmission line, and a differential line receiver 53 in FIG. 6. The recommended line drivers, which also would be used by a subsystem for asserting a pause/resume signal, are the AM26LS31 and the SN75151. The recommended line receiver is the AM26LS32. The twisted pair cable should have a characteristic impedance of approximately 120 ohms and be terminated at the receiving end with approximately 120 ohms across the pair. One conductor of the pair connects the positive output of the driver to the positive input of the receiver. The other conductor connects the negative output to the negative input. The interface asserts a pause (stop execution) signal active low. The inactive state of the pause signal, high, is the resume (restart execution) signal. These active and inactive states apply to the positive differential output or input of the differential line driver and receiver. The driver signals are always active or inactive and never disabled to the high-impedance output state.

Figure 8:
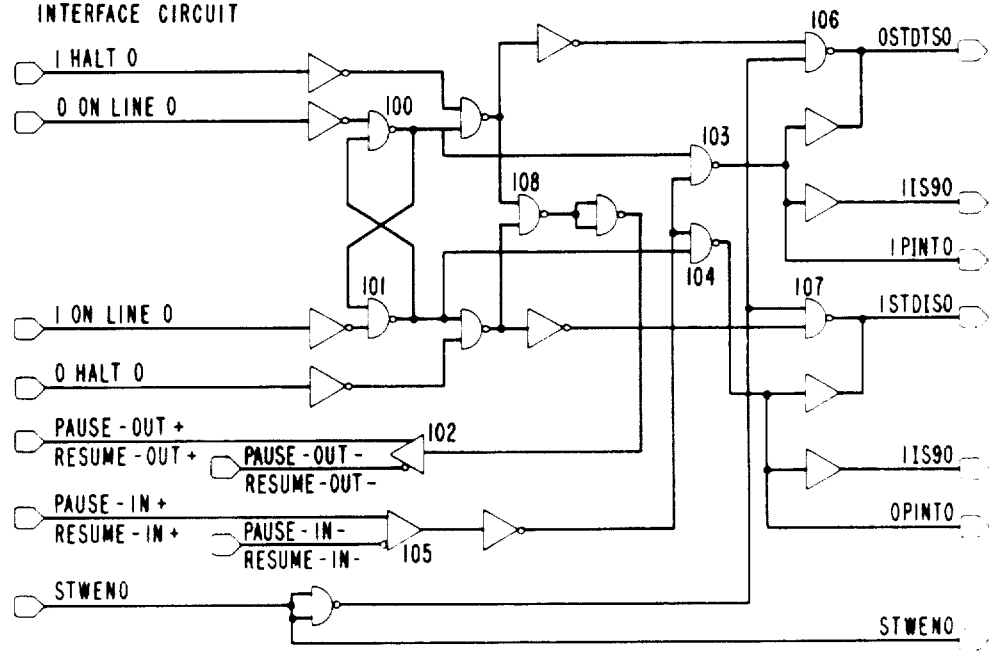
FIG. 8 is a portion of the present embodiment showing an interface circuit for use with a specific exemplary processor.

FIG. 8 shows an embodiment of a circuit to interface with a 3B processor. 3B is a full duplex processor, with two fully operational Central Controls operating in synchronism with individual sanity timers.

Figure 9:
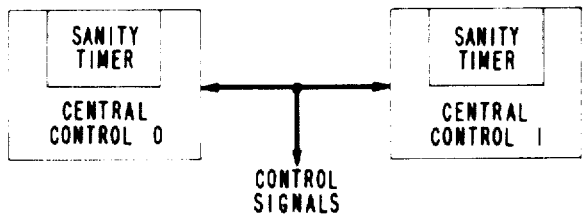
FIG. 9 is a block diagram of a processor controllable by the present invention.

A 3B processor is described in a technical paper "The 3B Duplex processor system and its application to TSPS" by J. R. Kane, M. W. Rolund and J. M. Scanlon, presented at the International Switching Symposium, held in Montreal, Canada, Sept. 24, 1981, and published in the report of that meeting. This report is incorporated herein by reference. The block diagram in FIG. 9 shows the 3B Central Controls (CC) with their sanity timers. Control signals are taken from the two CC's to connect with the interface circuit of FIG. 8. The two individual Central Control units of the 3B, e.g. CC1 or CC0, may either be on-line or off-line at any given moment depending upon their maintenance status.

The 3B interface circuit of FIG. 8 performs three functions: the generation of the 3B pause-out signal, the reception of the 3B pause-in signal, and the administration of the sanity timer in the off-line CC. The 3B also requires an enable signal for both CC's in order to allow the Stop The World feature to work. This signal is generated on the Subsystem Synchronization Interface circuit. The 3B interface circuit provides a signal path for the enable signal and uses it as a qualifying signal when administering the sanity timers.

The hardware interface for the 3B to Subsystem Synchronization is provided by the 3B Interface circuit of FIG. 8. This circuit accesses six backplane signals on both CC's of the 3B. Four of these signals from each CC; Halt, Online, Interrupt Set 9, and Panel Interrupt; are translated by the 3B Interface circuit into the pause/resume signals required by Subsystem Synchronization. The other signals, STW (Stop The World) enable and Sanity Timer Disable, are used to enable the Stop The World feature and to disable the sanity timer of the off-line CC, respectively. All of these signals are active low.

The 3B Interface circuit uses a three pair cable to interface the pause/resume signals and the STW enable signal to the Subsystem Synchronization Interface circuit.

The 3B pause-out signal is generated whenever the on-line CC halts. In order to generate the pause-out signal, the 3B interface circuit monitors the status of the halt (1 HALT 0, 0 HALT 0) and on-line (0 ONLINE 0, 1 ONLINE 0) signals of each CC. Signal names e.g., 1 HALT 0 with a "1" prefix are associated with CC1 and signal names e.g., 0 HALT 0 with a "0" prefix are associated with CC0. The zero suffix indicates active low. The halt signals of each CC are the actual pause-out signals. The on-line signals drive a steering network to insure that only the on-line CC can assert the pause-out signal. This steering network includes cross-coupled NAND gates 100 and 101 which perform the function of a set/reset flip-flop. The steering network is so designed to insure that only when the on-line CC goes off-line will the other CC be able to assert the pause-out signal. This eliminates problems during those situations when both CC's are on-line. The 3B interface circuit provides a differential driver 102 for the pause-out signal in order to satisfy the differential interface of Subsystem Synchronization.

The 3B pause-in signal is received and recognized whenever the on-line CC receives a panel interrupt and bit 9 of the Interrupt Set Register in the 3B is set. Also, the off-line CC does not receive the panel interrupt so that its executing diagnostics are not interfered with. Whenever the 3B interface circuit receives a pause-in signal, the on-line steering network determines which CC is on-line (gates 103, 104) and allows the pause-in signal to generate a panel interrupt (1PINT0, 0PINT0) and to set bit 9 of the Interrupt Set Register of that CC (1IS90, 0IS90). The interface circuit provides a differential receiver 105 for the pause-in signal to satisfy the differential interface requirement.

The on-line CC administers its own sanity timer and the sanity timer of the off-line CC whenever the 3B is executing. However, if the 3B halts or is halted due to Subsystem Synchronization testing, the on-line CC only administers its own sanity timer. Therefore, in order to allow a full duplex 3B with sanity timers uninhibited to work with Subsystem Synchronization, the 3B interface circuit administers the sanity timer of the off-line CC if the on-line CC halts or is halted due to Subsystem Synchronization. Otherwise, the sanity timer of the off-line CC will generate a Maintenance Restart Function within the 3B in order to initialize and become the on-line CC. When the 3B halts, the steering network and halt signals are used to generate a 3B pause-out signal (gate 108). The pause-out signal is then qualified with the enable signal (STWEN0) for the 3B (gates 106, 107) to generate a disable signal for the sanity timer of the off-line CC (1STDIS0, 0STDIS0). If Subsystem Synchronization is enabled, the sanity timer of the off-line CC will be disabled. Otherwise, the Stop The World feature for the 3B is disabled and the sanity timers must be administered by the 3B. When the 3B interface circuit receives a pause-in, the steering network determines the on-line CC and allows the signals to be generated which will halt the 3B. This same circuitry also generates the signal to disable the sanity timer in the off-line CC. It is not necessary to qualify these signals with the enable signal for the 3B since the pause-in signal will not be received unless Subsystem Synchronization is enabled.

In summary, the present invention provides a synchronized halt test arrangement for a plurality of subsystem processors of FIGS. 1, 3, 4 and 9. One such processor, such as processor 40 of FIG. 1 is equipped for generating a pause output signal to request a testing halt of an execution of program instructions by other of said processors and a resume output signal to request a resumption of an execution of those program instructions by the other processors. Subsystem synchronization is achieved with a logic circuit (FIGS. 1, 5-7) which is responsive to the generated pause output request signal for concurrently furnishing a pause input control signal to each of the other processors (such as processors 41 and 42 of FIG. 1, 30 and 31 of FIG. 3 and the processor with the central control 0 and 1 of FIG. 9) for concurrently halting program execution thereby. The logic circuit is further responsive to a generated resume output request signal for concurrently providing a resumption control signal to each of the other processors concurrently to effect a resumption of program execution thereby.

The two central controls 0 and 1 of FIG. 9 are interfaced by circuitry of FIG. 8 and operate in synchronism with individual sanity timers. The interface circuitry is responsive to a test halt signal from the on-line one of the central controls for controlling a synchronized halting of the off-line and of the central controls. The interface circuitry comprises amplifier and gating circuitry of FIG. 8 for monitoring halt signals on conductors 1 HALT 0 and 0 HALT 0 and on-line signals on conductors 0 ONLINE 0 and 1 ONLINE 0 for each of the central controls 0 and 1. The gates 100, 101 and 108 of FIG. 8 cooperate for enabling only the on-line central control to generate a pause output or halt signal and the off-line central control to generate a pause output or halt signal only in response to the on-line central control switching to an off-line status. Gates 103 and 104 are controlled by the gates 100 and 101 for generating a halt interrupt signal on conductors 1PINT0 and 0PINT0 operationally to halt the on-line central control and to disable via conductors 0STDIS0 or 0STDIS0 the sanity timer of the off-line central control. Gates 103, 104 and 105 are independently responsive to the generated pause input request signal for halting program execution by the on-line central control and disabling the sanity timer of the off-line central control.

The software necessary to implement Subsystem Synchronization is normally provided as an additional feature of the test utility or base-level microcode for each of the subsystems. This feature allows the system to pause and resume execution of the application program in an efficient and graceful manner. This software feature actually consists of two parts. One part provides the subsystem with the capability to assert a pause/resume condition while the other part provides the capability to receive a pause/resume condition. The test utility for a subsystem, which needs the capability to assert a pause/resume, provides a routine that allows the utility to pause the execution of the user application program, to save the application program state, and to broadcast a pause condition. Further, the routine must allow the utility to restore the application program state, to restart execution of the application program, and to broadcast a resume condition. For a subsystem that needs the capability to receive a pause/resume condition, a routine is provided that allows the utility to recognize a pause condition, to stop the execution of the application program, and to save the application program state. Additionally, the routine allows the utility to recognize a resume condition, to restore the application program state, and to resume execution of the application program.

An exemplary computer program method is described by the following activities:

Asserting a Pause Signal
1. A hardware or software interrupt is fielded by a utility handler.
2. An interrupt handler determines and saves the source of the interrupt.
3. Block the utility and application interrupts.
4. A pause-out condition is asserted signifying that the utility is executing on the target.
5. The state of the application program is saved.
6. The utility analyzes the source of the interrupt and takes the appropriate action, such as printing register contents.
7. A return to the application program is initiated.
8. The state of the application program is restored.
9. The pause-out condition is released.
10. The utility interrupts are enabled.
11. The pause-in condition is polled for the inactive state.
12. The pause-in condition goes inactive.
13. The utility recognizes the inactive pause-in state.
14. Application interrupts are enabled by the utility, specifically the pause-in interrupt.
15. The user application program resumes executing on the target.

Receiving a Pause signal.
1. A hardware or software induced interrupt is fielded by the utility interrupt handler.
2. The interrupt handler determines and saves the source of the interrupt.
3. The utility and application interrupts are blocked.
4. A pause-out condition is asserted signifying that the utility is executing on the target.
5. The state of the application program is saved.
6. The utility analyzes the source of the interrupt (in this case, a pause-in condition) and takes the appropriate action.
7. The state of the application program is restored.
8. The pause-out condition is released.
9. The utility interrupts are enabled.
10. The pause-in condition is polled for the inactive state.
11. The pause-in condition goes inactive.
12. The utility recognizes the inactive pause-in condition.
13. The application interrupts are enabled by the utility.
14. The user application program resumes executing on the target.

What is claimed is:

1. In an arrangement for testing a multiprocessing system comprising a plurality of processors, the combination comprising
   means in one of said processors for generating a pause signal to request a pausing of an execution of a sequence of program instructions by other of said processors, and
   means responsive to a generated pause request signal from said one of said processors to produce a pause control signal; and
   each of said other of said processors comprising means responsive to said pause control signal to halt said execution of sequence of program instructions.

2. The combination in accordance with claim 1 wherein said means responsive to said generated request signal comprises a plurality of input channels means, each connected to an individual one of said processors;
   a logic circuit means connected to each of said input channel means and responsive to said generated pause requesting signal applied to a one of said input channels to generate a logic output signal; and
   output channel means connected to said processors and responsive to said output signal for transmitting to said connected processors said pause control signal.

3. The combination in accordance with claim 2 wherein said logic circuit means further comprises delay means for delaying said transmitting of said output signal on said output channels to said connected processors.

4. The combination in accordance with claim 2 further comprising switch means for manually operating said logic circuit means to generate said logic output signal; and
   display means for indicating manual halting operation of said multiprocessor system testing arrangement.

5. The combination in accordance with claim 2 further comprising system override switch means to inhibit the generation of said logic output signal and display means providing an indication of the inhibit condition; whereby the pause control signal is inhibited from controlling said other of said processors.

6. The combination in accordance with claim 2 further comprising means for indicating the transmission of said output signal to said processors.

7. A synchronized halt test arrangement for a plurality of processors comprising means in one of said processors for generating a pause output signal to request a halt of an execution of program instructions by other of said processors, logic circuit means responsive to a generated pause request signal from said one of said processors for concurrently furnishing a pause input control signal to each of the other of said plurality of processors concurrently halting program execution thereby, and means responsive to a receipt of a resume output signal from said one of said processors for activating said logic circuit means to interrupt said furnishing of said pause input control signal to each of said other of said plurality of processors to resume program execution thereby.

8. A halt test arrangement in accordance with claim 7 wherein said generating means comprises interface circuitry for generating said pause output signal said resume output signal.

9. A halt test arrangement in accordance with claim 8 wherein said one of said processors comprises target processor means and support processor means interconnected by said interface circuitry for testing of said target processor means under control of said support processor means, and said support processor means being effective for independently generating a pause output signal and resume output signal.

10. A halt test arrangement in accordance with claim 9 wherein said interface circuitry comprises a data link means, memory means, and control circuit means communicating over said data link means with said support processor means for testing of said target processor means and for effecting a storage of test data in said memory means.

11. In a synchronized halt test arrangement for a full duplex processor having two central control means operating in synchronism with individual sanity timer means, one of said central control means being operationally on-line and the other one of said central control means being selectively and operationally off-line for controlling operations of an information processing system, circuit means interfacing said two central control means responsive to a halting signal from said on-line one of said central control means for controlling a synchronized halting of said off-line one of said central control means, said interfacing circuit means comprising means for monitoring halt signals and on-line signals from each of said central control means means cooperating with said monitoring means and being responsive to a receipt of said on-line signal for enabling only said on-line one of said central control means to generate a halt signal and said off-line one of said central control means to generate a halt signal only in response to said on-line one of said central control means switching to an off-line status, and means responsive to a receipt of an input pause request signal and controlled by said enabling means for said on-line one of said central control means for generating an interrupt halt operationally to halt said on-line central control means and to disable said sanity timer means of said off-line central control means.

12. A synchronized halt test arrangement for a plurality of processors, means in one of said processors for generating a pause signal to request a testing halt of an execution of program instructions by other of said processors and a resume output signal to request a resumption of an execution of said program instructions by said other of said processors, logic circuit means responsive to a generated pause request signal from said one of said processors for concurrently furnishing a pause input control signal to each of the other of said processors concurrently halting program execution thereby and being further responsive to a generated resumption request signal from all of said processors for concurrently providing a resumption control signal to each of said other processors concurrently to effect a resumption of said program execution thereby, a specific one of said plurality processors comprising a full duplex processor having two central control means operating in synchronism with individual sanity timer means, one of said central control means being on-line and the other one of said central control means being selectively off-line for controlling operations of an information processing system, circuit means interfacing said two central controls being responsive to said a test halt signal from said on-line one of said central control means for controlling a synchronized halting of said off-line one of said central control means, said interfacing circuit means comprising means for monitoring halt signals and on-line signals from each of said central control means, means cooperating with said monitoring means and being responsive to a receipt of said on-line signals for enabling only said on-line one of said central control means to generate a halt signal and said off-line one of said central control means to generate a halt signal only in response to said on-line one of said central control means switching to an off-line status, means responsive to a receipt of a halt signal and controlled by said enabling means for generating a halt interrupt signal, signal to operationally halt said on-line central control means and to disable said sanity timer means of said off-line central control means and logic means independently responsive to said generated pause request signal for halting program execution by said on-line central control means and disabling said sanity timer means of said off-line central control means and further responsive to said resume output signal for effecting a resumption of said program execution by the halted on-line central control means and an enablement of said sanity timer means of said off-line central control means.

* * * * *